United States Patent
N

(10) Patent No.: US 11,920,498 B2
(45) Date of Patent: Mar. 5, 2024

(54) TURBINE CIRCUMFERENTIAL DOVETAIL LEAKAGE REDUCTION

(71) Applicant: General Electric Company, Schenectady, NY (US)

(72) Inventor: Arvind N, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/956,314

(22) Filed: Sep. 29, 2022

(65) Prior Publication Data

US 2023/0037224 A1  Feb. 2, 2023

Related U.S. Application Data

(63) Continuation of application No. 16/881,895, filed on May 22, 2020, now Pat. No. 11,486,261.

(30) Foreign Application Priority Data

Mar. 31, 2020  (IN) .............................. 202011014246

(51) Int. Cl.
 *F01D 5/32* (2006.01)
 *F01D 5/30* (2006.01)
 (Continued)

(52) U.S. Cl.
 CPC ........... *F01D 5/326* (2013.01); *F01D 5/3038* (2013.01); *F01D 5/32* (2013.01); *F01D 11/008* (2013.01); *F04D 19/00* (2013.01); *F04D 29/322* (2013.01)

(58) Field of Classification Search
 CPC .......... F01D 5/326; F01D 5/3038; F01D 5/32; F01D 11/008; F04D 19/00; F04D 29/322
 See application file for complete search history.

(56) References Cited

U.S. PATENT DOCUMENTS 1,500,787 A * 7/1924 Anderson ................. F01D 5/32
 416/217
2,873,088 A  2/1959 Neumann
 (Continued)

FOREIGN PATENT DOCUMENTS

EP  1744013  1/2007

OTHER PUBLICATIONS

United States Patent and Trademark Office, "Non-Final Office Action," issued in connection with U.S. Appl. No. 16/881,895, dated Mar. 30, 2021, 7 pages.
 (Continued)

*Primary Examiner* — Woody A Lee, Jr.
*Assistant Examiner* — Eric A Lange
(74) *Attorney, Agent, or Firm* — Hanley, Flight & Zimmerman, LLC

(57) ABSTRACT

Methods, apparatus, systems and articles of manufacture are disclosed. An example apparatus includes a compressor comprising a rotor defining a radial direction and a circumferential direction, the rotor including a slot; a first blade and a second blade disposed in the slot, the first blade including a first platform and a first dovetail, the second blade including a second platform and a second dovetail; and a hollow block disposed circumferentially between the first blade and the second blade in the slot, the hollow block including: a platform interface portion to interface with the first platform and the second platform, the platform interface portion including a central opening defined by a circumferential face of the platform interface portion; and a hollow dovetail interface portion to couple the first dovetail and the second dovetail.

17 Claims, 9 Drawing Sheets

(51) Int. Cl.
*F01D 11/00* (2006.01)
*F04D 19/00* (2006.01)
*F04D 29/32* (2006.01)

(56) References Cited

U.S. PATENT DOCUMENTS

| | | | |
|---|---|---|---|
| 3,088,708 | A | 5/1963 | Feinberg |
| 4,743,166 | A * | 5/1988 | Elston, III ............ F01D 5/3038 |
| | | | 416/193 A |
| 5,228,835 | A | 7/1993 | Chlus |
| 5,785,499 | A | 7/1998 | Houston et al. |
| 6,398,499 | B1 | 6/2002 | Simonetti et al. |
| 6,981,847 | B2 | 1/2006 | Arinci et al. |
| 7,374,400 | B2 | 5/2008 | Boswell |
| 8,066,489 | B2 | 11/2011 | Holmes |
| 8,070,448 | B2 * | 12/2011 | Morris .................. F01D 11/008 |
| | | | 416/204 R |
| 8,393,869 | B2 | 3/2013 | Kim et al. |
| 9,863,257 | B2 | 1/2018 | Snyder et al. |
| 2007/0014667 | A1 | 1/2007 | Pickens et al. |
| 2008/0206054 | A1 | 8/2008 | Holmes |
| 2015/0101347 | A1 | 4/2015 | Potter et al. |
| 2015/0101351 | A1 * | 4/2015 | Healy ..................... F01D 5/303 |
| | | | 416/220 R |
| 2016/0222798 | A1 | 8/2016 | Snyder et al. |
| 2018/0187559 | A1 | 7/2018 | Thistle et al. |
| 2020/0072064 | A1 | 3/2020 | Sippel et al. |
| 2021/0301673 | A1 | 9/2021 | N |

OTHER PUBLICATIONS

United States Patent and Trademark Office, "Final Office Action," issued in connection with U.S. Appl. No. 16/881,895, dated Oct. 12, 2021, 11 pages.
United States Patent and Trademark Office, "Advisory Action," issued in connection with U.S. Appl. No. 16/881,895, dated Jan. 20, 2022, 3 pages.
United States Patent and Trademark Office, "Non-Final Office Action," issued in connection with U.S. Appl. No. 16/881,895, dated Feb. 2, 2022, 10 pages.
United States Patent and Trademark Office, "Notice of Allowance and Fee(s) Due," issued in connection with U.S. Appl. No. 16/881,895, dated Jun. 24, 2022, 12 pages.
United States Patent and Trademark Office, "Restriction Requirement," issued in connection with U.S. Appl. No. 16/881,895, dated Jan. 4, 2021, 7 pages.

* cited by examiner

TURBINE CIRCUMFERENTIAL DOVETAIL LEAKAGE REDUCTION

RELATED APPLICATIONS

This patent arises from a continuation of U.S. patent application Ser. No. 16/881,895, (Now U.S. Pat. No. 11,486,261) which was filed on May 22, 2020, which claims priority to Indian Provisional Patent Application Serial No. 202011014246, which was filed on Mar. 31, 2020. U.S. patent application Ser. No. 16/881,895 and Indian Provisional Patent Application Serial No. 202011014246 are hereby incorporated herein by reference in their entirety. Priority to U.S. patent application Ser. No. 16/881,895 and Indian Provisional Patent Application Serial No. 202011014246 is hereby claimed.

FIELD OF THE DISCLOSURE

This disclosure relates generally to gas turbines, and, more particularly, to turbine circumferential dovetail leakage reduction.

BACKGROUND

Gas turbines, also known as combustion turbines and turbine engines, are used in a variety of applications such as industrial power production and aircraft propulsion systems. These gas turbines include one or more compressor stages, a combustor, and one or more turbine stages. Aircrafts include gas turbines (e.g., combustion turbines, turbine engines, etc.) in their propulsion systems to generate thrust.

BRIEF SUMMARY

Methods, apparatus, systems, and articles of manufacture corresponding to compressor blocks for gas turbines are disclosed.

Certain examples provide for an example apparatus, the apparatus including a rotor defining a radial direction and a circumferential direction, the rotor including a slot with a neck. The example apparatus also includes a first blade and a second blade disposed in the slot, the first and second blades each having a protrusion and a platform. The example apparatus also includes a block disposed circumferentially between the first blade and the second blade in the slot, the block radially retained by at least one of a) the neck or b) the platforms of the first and second blades.

Certain examples provide for an example compressor including a rotor defining a circumferential direction, wherein the rotor includes a slot, the slot including a first neck portion. The example compressor also includes a first blade and a second blade disposed circumferentially apart in the slot. The example compressor also includes a block disposed in the slot circumferentially between the first blade and the second blade, the block including second neck portion, the first neck portion to at least partially interface the second neck portion.

Certain examples provide for an example gas turbine including a compressor rotor, the compressor rotor including a slot. The example gas turbine also includes a first blade and a second blade disposed in the slot, the first and second blades including a platform and a dovetail. The example gas turbine also includes a block disposed in the slot between the first and second blades, the block to interface the platform and dovetail of the first blade and the platform and dovetail of the second blade.

Figure 1:
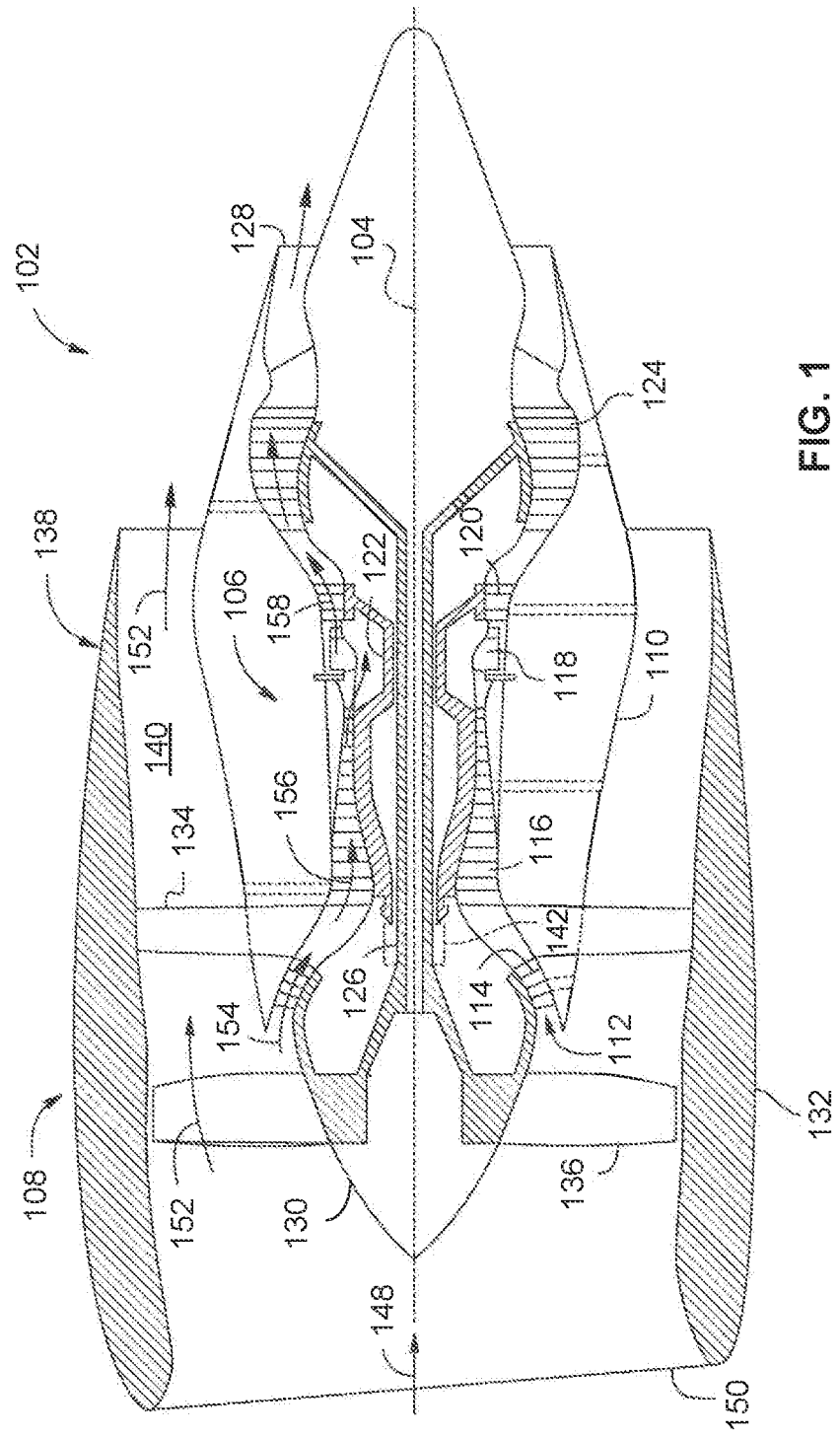
FIG. 1 is an example turbofan engine for propulsion of an aircraft that can be implemented in connection with the teachings of this disclosure.

The figures are not to scale. Instead, the thickness of regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" and/or "direct contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircrafts include engines that act as a propulsion system to generate mechanical power and forces such as thrust. A gas turbine, also called a combustion turbine or a turbine engine, is a type of internal combustion engine that can be implemented in the propulsion system of an aircraft. For example, a gas turbine can be implemented in connection with a turbofan or a turbojet aircraft engine. Gas turbines also have significant applications in areas such as industrial power generation.

As used herein, the terms "axial" and "longitudinal" both refer to a direction parallel to the centerline axis of an gas turbine (e.g., a turbofan, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine towards the centerline axis of the gas turbine, and "radially outward" refers to the radial direction from the centerline axis of the gas turbine towards the outer circumference of gas turbine. As used herein, the terms "forward", "fore", and "front" refer to a location relatively upstream in an air flow passing through or around a component, and the terms "aft" and "rear" refer to a location relatively downstream in an air flow passing through or around a component.

The basic operation of a gas turbine implemented in connection with a turbofan engine of a propulsion system of an aircraft includes an intake of fresh atmospheric air flow through the front of the turbofan engine with a fan. In the operation of a turbofan engine, a first portion of the intake air bypasses a core gas turbine engine of the turbofan to produce thrust directly. A second portion of the intake air travels through a booster compressor (e.g., a first compressor) located between the fan and a high-pressure compressor (e.g., a second compressor) in the core gas turbine engine (e.g., the gas turbine). The booster compressor is used to raise or boost the pressure of the second portion of the intake air prior to the air flow entering the high-pressure compressor. The air flow can then travel through the high-pressure compressor that further pressurizes the air flow. The booster compressor and the high-pressure compressor each include a group of blades attached to a rotor and/or shaft. The blades spin at high speed relative to stationary vanes and each subsequently compresses the air flow. The high-pressure compressor then feeds the pressurized air flow to a combustion chamber (e.g., combustor). In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow. A secondary use of the compressors, particularly the high-pressure compressor, is to bleed air for use in other systems of the aircraft (e.g., cabin pressure, heating, and air conditioning, etc.)

In the combustion chamber of the core gas turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. The turbine can include a low-pressure turbine and a high-pressure turbine, for example. Each of the low-pressure turbine and the high-pressure turbine includes an intricate array of alternating rotating blades and stationary airfoil-section blades (e.g., vanes). The high-pressure turbine is located axially downstream from the combustor and axially upstream from the low-pressure turbine. As the hot combustion gas passes through the turbine, the hot combustion gas expands through the blades and/or vanes, causing the rotating blades couples to rotors of the high-pressure turbine and the low-pressure turbine to spin.

The rotating blades of the high-pressure turbine and the low-pressure turbine serve at least two purposes. A first purpose of the rotating blades is to drive the fan, the high-pressure compressor, and/or the booster compressor to draw more pressured air into the combustion chamber. For example, in a dual-spool design of a turbofan, the low-pressure turbine (e.g., a first turbine) can be attached to and in force transmitting connection with the booster compressor (e.g., the first compressor) and fan via a first shaft, collectively a first spool of the gas turbine, such that the rotation of a rotor of the low-pressure turbine drives a rotor of the booster compressor and the fan. For example, a high-pressure turbine (e.g., a second turbine) can be attached to and in force transmitting connection with the high-pressure compressor (e.g., a second compressor) via a second shaft coaxial with the first shaft, collectively a second spool of the gas turbine, such that the rotation of a rotor of the high-pressure turbine drives a rotor of the high-pressure compressor. A second purpose of the rotating blades is to spin a generator operatively coupled to the turbine section to produce electricity. For example, the turbine can generate electricity to be used by an aircraft, a power station, etc.

It is generally an object of the design of aircraft engines such as turbofans to compress as much air as is feasible within the compressor of the a core gas turbine engine given the static, dynamic, centrifugal and/or thermal stress limitations and weight considerations of aspects of the core gas turbine engine and/or the turbofan engine. A metric defining the compressive action of a compressor is a compression ratio (e.g., pressure ratio) of a compressor. The compression ratio of a compressor of a turbofan engine is the ratio of pressure at an outlet of the compressor (e.g., the outlet of the high-pressure compressor at the combustion chamber of the gas turbine) to pressure at an inlet of a fan. A higher compression ratio increases a thermal efficiency of the turbine engine and decreases a specific fuel consumption of the turbine engine (e.g., a ratio of fuel used to thrust produced by the jet engine). Thus, an increase in the compression ratio of the compressor of a gas turbine can increase thrust produced by a jet engine, such as a turbofan, etc., and/or can increase fuel efficiency of the jet engine. In turn, it is an object of gas turbine design to minimize or otherwise reduce pressure losses through the compressors to maximize or otherwise improve the compression ratio. Though examples disclosed herein are discussed in connection with a turbofan jet engine, it is understood that examples disclosed herein can be implemented in connection with a turbojet jet engine, a turboprop jet engine, a combustion turbine for power production, or any other suitable application where it is desired to increase compression ratios across one or more compressors.

The example low-pressure compressor and high-pressure compressor of the turbine engine of the turbofan each include one or more stages. Each stage includes an annular array of compressor blades (e.g., first airfoils) mounted about a central rotor paired with an annular array of stationary compressor vanes (e.g., second airfoils) spaced apart from the rotor and fixed to a casing of the compressor. At an aft portion of a compressor stage, rotation of the rotor and accompanying blades provides an increase in velocity, temperature, and pressure of air flow. At a fore portion of the compressor stage, the air flow diffuses (e.g., loses velocity) across compressor vanes providing for an increase in pressure. The implementation of multiple stages across the low-pressure compressor and high-pressure compressor provides for the compression ratios to operate a jet engine such as a turbofan.

In the example of the high-pressure compressor and the low-pressure compressor, compressor blades (also referred to herein as blades and/or dovetail blades) are arrayed about a corresponding high-pressure compressor rotor and low-pressure compressor rotor, respectively. The high-pressure rotor and accompanying compressor blades (e.g., blades, dovetail blades, etc.) are typically fashioned from Titanium alloys (e.g., a Titanium-Aluminum alloy, a Titanium-Chromium alloy, etc.) and/or Steel alloys (e.g., a Steel-Chromium alloy), etc. For example, to increase ease of maintenance and assembly, replaceability of blades, and/or modularity of the high-pressure compressor, discrete compressor blades are mounted in series annularly about the high-pressure rotor to achieve a substantially uniform distribution annularly about the rotor. For this purpose, an example compressor blade implemented in accordance with the teachings of this disclosure includes an airfoil portion and a mounting portion. The airfoil portion of the compressor blade causes the velocity, pressure, and temperature increase to the air flow. The mounting portion of the compressor blade enables mounting of blade to the rotor. In some examples, the geometry of the airfoil portion and/or mounting portion can be different for the compressor blades of each stage of the high-pressure compressor and the same for the compressor blades within each stage of the high-pressure compressor.

In one example, the mounting portion of the example compressor blade includes a dovetail protrusion and a platform. In this example, the high-pressure compressor rotor is provided at each stage with a reciprocal annular dovetail slot (e.g., also referred to herein as a slot) to receive the dovetail protrusions of a plurality of blades of the stage. For example, a compressor blade can be in a mounted state with a high-pressure rotor when the dovetail slot of the high-pressure compressor rotor receives the dovetail protrusion of the compressor blade. In this example, the dovetail protrusion of the blade defines a radially outer portion (e.g., a portion relatively radially outward when mounted) and a radially inner portion (e.g., a portion relatively radially inward when mounted). In this example, the radially outer portion is relatively less in axial length (e.g., when mounted, the length in the axial direction of the turbine engine and/or compressor) than the radially inner portion. The dovetail slot also includes a radially outer portion and a radially inner portion. For example, the radially outer portion can include a pair of annular flanges (e.g., a neck, a first neck, etc.) extending axially towards the center of the dovetail slot. The dimensions of the compressor blade and the dovetail slot are such that when the compressor blade is in a mounted state with the compressor blade, the annular flanges (e.g., a neck) of the dovetail slot interfere with the radially inner portion of the compressor blade, thereby retaining the compressor blade from radially outward movement.

In this example, the platform of the compressor blade extends in the circumferential, radial, and/or axial direction when viewed in a mounted state. The platform of the compressor blade is to provide a base for the airfoil portion of the compressor blade. For example, in a mounted state, a leading edge of the airfoil portion of the compressor blade can be axially and circumferentially displaced from a trailing edge. The platform of the compressor blade is to further retain the compressor blade in the dovetail slot. For example, the platform portion can extend axially over the flanges of the dovetail slot to further retain the compressor blade relative to the dovetail slot. The platform of the dovetail slot is to prevent the air flow in the high-pressure compressor from entering (e.g., leaking) into a dovetail slot. However, leakage of air flow into the dovetail slot can occur. In leakage patterns associated with the dovetail slot, a portion of the air flow enters at the aft of the dovetail slot and exits at the fore of the dovetail slot (e.g., moves from relatively higher pressure to relatively lower pressure). Accordingly, the exit of the portion of air flow exiting the fore of the dovetail slots forms leakage which lowers the compression ratio of a compressor and its mitigation is desired. Additionally, the leakage causes undesirable heating and/or thermal stress in the blades and/or rotor of a compressor.

Traditionally, a plurality of compressor blades of a stage are mounted annularly in a dovetail slot directly in series such that the platform of each blade interfaces with the platform of a first subsequent blade on a first circumferential side and interfaces with the platform of a second subsequent blade on a second circumferential side. Leakage of airflow into the dovetail slot is particularly high at these interfaces. These leakage patterns are described in further detail in FIG. 7.

In some high-pressure compressors, sealant wires (e.g., seal wires, wire seals, etc.) to prevent leakage are placed circumferentially about the rotor at or near each flange of the dovetail slot of a stage and at the interfaces of the dovetail slot with the platforms of the compressor blades. For this purpose, the high-pressure compressor rotor is provided with an annular seal gland (e.g., annular groove) proximate each flange of a dovetail slot to receive respective sealant wires. Known sealant wires are disadvantageous in that the sealant wires cause wear to both the seal glands of the rotor and the platforms of the compressor blades where the sealant wires interface. This wear can reduce the life of both the compressor blades and the high-pressure compressor rotor and can lead to failure of the blades and rotor and/or the shortening of the lifespan of the blades and/or rotor. Known sealant wires are also disadvantageous in that they are inadequate to reduce leakage into the dovetail slot, particularly at the circumferential interfaces of the platforms of the compressor blades. Further, the necessity of machining seal glands on a high-pressure compressor rotor is burdensome. Examples disclosed herein eliminate the need for sealant wire and further reduce air flow leakage into dovetail slots of a compressor.

As used herein, a "block" refers to an integral and/or rigid object with any number of geometric variations. Disclosed herein are example compressor blocks (also referred to herein as blocks). For example, the compressor block (e.g., the block) can be a dovetail block. In some examples, compressor blocks (e.g., blocks) in accordance with the teachings of this disclosure are installed in a dovetail slot in an alternating sequence with compressor blades to prevent the leakage of air flow into the dovetail slot. An example compressor block can be placed between two compressor blades in the dovetail slot such that the platforms of the compressor blades no longer directly interface. Instead, the two platforms can each interface respective circumferential faces of the compressor block. In some examples, the compressor block includes a platform interface portion to interface with the platforms of the compressor blades and to interface with the radially outer portions of the flanges of the dovetail slot. In some examples, the compressor block includes a neck (e.g., a second neck) to interface with a neck (e.g., a first neck) defined by the axial flanges of the dovetail slot. In some of these examples, the compressor block also includes a dovetail interface portion (e.g., a portion at and/or below the neck of the dovetail slot) to interface with the dovetail portions of compressor blades, radially inner portions of the flanges of the dovetail slot, and/or an inner cavity of the dovetail slot. By physically blocking the leakage pathways within the dovetail slot of the high-pressure compressor rotor, the compressor blocks prevent air flow from entering the dovetail slot at a point of higher pressure and exiting at a point of lower pressure (e.g., leakage). In some examples, a compressor block is placed between each pair of sequential compressor blades such that no two blades in a dovetail slot of a high-pressure compressor rotor interface directly.

Compressor blocks disclosed herein can be implemented with geometric variation. For example, some compressor blocks can be provided with radially inward protrusions (also referred to herein as arms and/or extended arms) at radially outer axial ends of the compressor block to be received by the seal glands that previously housed sealant wires. In this example, the compressor blocks are retrofitted to an existing high-pressure compressor rotor and utilize the existing geometry of the high-pressure compressor rotor. For example, a high-pressure compressor rotor can be machined without seal glands, in which case the protrusions can be eliminated. In some examples, the compressor block does not extend below the neck of the dovetail slot and is instead retained by the platforms of the compressor blades. In some examples, the compressor block extends below the neck of the dovetail slot but does not extend significantly into a lower cavity of the dovetail slot.

In some examples, compressor blocks can be formed from the same material as the compressor blades used in the high-pressure compressor. In other examples, the compressor blocks can be formed from a different material than the compressor blades. For example, the compressor blocks can be formed from Titanium alloys (e.g., a Titanium-Aluminum alloy and/or a Titanium-Chromium alloy, etc.), Steel alloys (e.g., a Steel-Chromium alloy, etc.), Nickel Alloys (e.g., a Nickle-Copper alloy, a Nickle-Iron alloy, a Nickle-Chromium alloy, a Nickle-Niobium alloy, and/or a Nickle-Carbon alloy, etc.), and/or Ceramic Matrix Composites (CMCs), etc. For example, the compressor blocks can be formed from material that will not significantly wear the material of the high-pressure compressor and/or the compressor blades. In some examples, the compressor blocks are manufactured using additive manufacturing techniques such as Selective Laser Sintering (SLS), Selective Laser Melting (SLM), etc. In other examples, the compressor blocks are manufactured using subtractive manufacturing techniques such as Computer Numerical Control (CNC) milling, Electrochemical Machining (ECM), etc. In yet other examples, the compressor blocks can be formed of sheet metal and/or manufactured using sheet metal forming processes (e.g., punching, rolling, bending, drawing, welding, etc.) Further, the compressor blocks can be hollow to reduce their weight and material necessity.

Though examples disclosed herein are discussed in connection with dovetail slots of a rotor of a high-pressure compressor of a core gas turbine engine of a turbofan engine, other examples can be implemented in accordance with the teachings of the present disclosure for a low-pressure compressor, an intermediate-pressure compressor, a sole compressor of a single spool gas turbine, a compressor with an alternative slot design, a compressor of a gas turbine for industrial power production, a turbine rotor and/or any other suitable application.

FIG. 1 is a schematic illustration of an example turbofan gas turbine engine 102. The example turbofan engine 102 includes an example core gas turbine engine 106, an example fan section 108, an example outer casing 110, an example annular inlet 112, an example booster compressor 114, an example high-pressure compressor 116 (e.g., a high-pressure, multi-stage, axial-flow compressor), an example combustor 118, a first example turbine 120, a first example drive shaft 122, a second example turbine 124, a second example drive shaft 126, an example exhaust nozzle 128, an example axial-flow fan rotor assembly 130, an example annular fan casing 132, example guide vanes 134, example fan rotor blades 136, an example downstream section 138, an example airflow conduit 140, an example speed reduction device 142, an example inlet 150, and example combustion products 158.

FIG. 1 is a cross-sectional view of the turbofan engine 102 that can be utilized within an aircraft in accordance with aspects of the disclosed examples. The turbofan engine 102 is shown having a longitudinal or axial centerline axis 104 extending throughout the turbofan engine 102 for reference purposes. The direction of this flow is shown by an arrow 148 in FIG. 1. These directional terms are used merely for convenience in description and do not require a particular orientation of the structures described thereby.

The turbofan engine 102 of FIG. 1 includes the core gas turbine engine 106 and the fan section 108 positioned upstream thereof. The core gas turbine engine 106 can generally include the substantially tubular outer casing 110 that defines an annular inlet 112. In addition, the outer casing 110 can further enclose and support the booster compressor 114 for increasing the pressure of the air that enters the core gas turbine engine 106 to a first pressure level. The high-pressure compressor 116 can then receive the pressurized air from the booster compressor 114 and further increase the pressure of such air to a second pressure level.

In the illustrated example of FIG. 1, the pressurized air exiting the high-pressure compressor 116 can then flow to the combustor 118 within which fuel is injected into the flow of pressurized air, with the resulting mixture being combusted within the combustor 118. The high-energy combustion products are directed from the combustor 118 along the hot gas path of the turbofan engine 102 to the first (high-pressure) turbine 120 for driving the high-pressure compressor 116 via the first (high-pressure) drive shaft 122, and then to the second (low-pressure) turbine 124 for driving the booster compressor 114 and fan section 108 via the second (low-pressure) drive shaft 126 that is generally coaxial with first drive shaft 122. After driving each of the turbines 120 and 124, the combustion products can be expelled from the core gas turbine engine 106 via the exhaust nozzle 128 to provide propulsive jet thrust.

In some examples, each of the compressors 114, 116 can include a plurality of compressor stages, with each stage including both an annular array of stationary compressor vanes and an annular array of rotating compressor blades positioned immediately downstream of the compressor vanes. Similarly, each of the turbines 120, 124 can include a plurality of turbine stages, each stage including both an annular array of stationary nozzle vanes and an annular array of rotating turbine blades positioned immediately downstream of the nozzle vanes.

Additionally, as shown in FIG. 1, the fan section 108 of the turbofan engine 102 can generally include the rotatable, axial-flow fan rotor assembly 130 that is configured to be surrounded by the annular fan casing 132. The fan casing 132 can be configured to be supported relative to the core gas turbine engine 106 by the plurality of substantially radially-extending, circumferentially-spaced outlet guide vanes 134. As such, the fan casing 132 can enclose the fan rotor assembly 130 and its corresponding fan rotor blades 136. Moreover, the downstream section 138 of the fan casing 132 can extend over an outer portion of the core gas turbine engine 106 to define the secondary, or by-pass, airflow conduit 140 that provides additional propulsive jet thrust.

In some examples, the second (low-pressure) drive shaft 126 is directly coupled to the fan rotor assembly 130 to provide a direct-drive configuration. Alternatively, the second drive shaft 126 can be coupled to the fan rotor assembly 130 via the speed reduction device 142 (e.g., a reduction gear or gearbox) to provide an indirect-drive or geared drive configuration. Such a speed reduction device(s) can also be provided between any other suitable shafts and/or spools within the turbofan engine 102 as desired or required.

During operation of the turbofan engine 102, an initial air flow (indicated by arrow 148) can enter the engine 102 through the associated inlet 150 of the fan casing 132. The air flow 148 then passes through the fan blades 136 and splits into a first compressed air flow (indicated by arrow 152) that moves through conduit 140 and a second compressed air flow (indicated by arrow 154) which enters the booster compressor 114. The pressure of the second compressed air flow 154 is then increased and enters the high-pressure compressor 116 (as indicated by arrow 156). After mixing with fuel and being combusted within the combustor 118, the combustion products 158 exit the combustor 118 and flow through the first turbine 120. Thereafter, the combustion products 158 flow through the second turbine 124 and exit the exhaust nozzle 128 to provide thrust for the turbofan engine 102.

Figure 2:
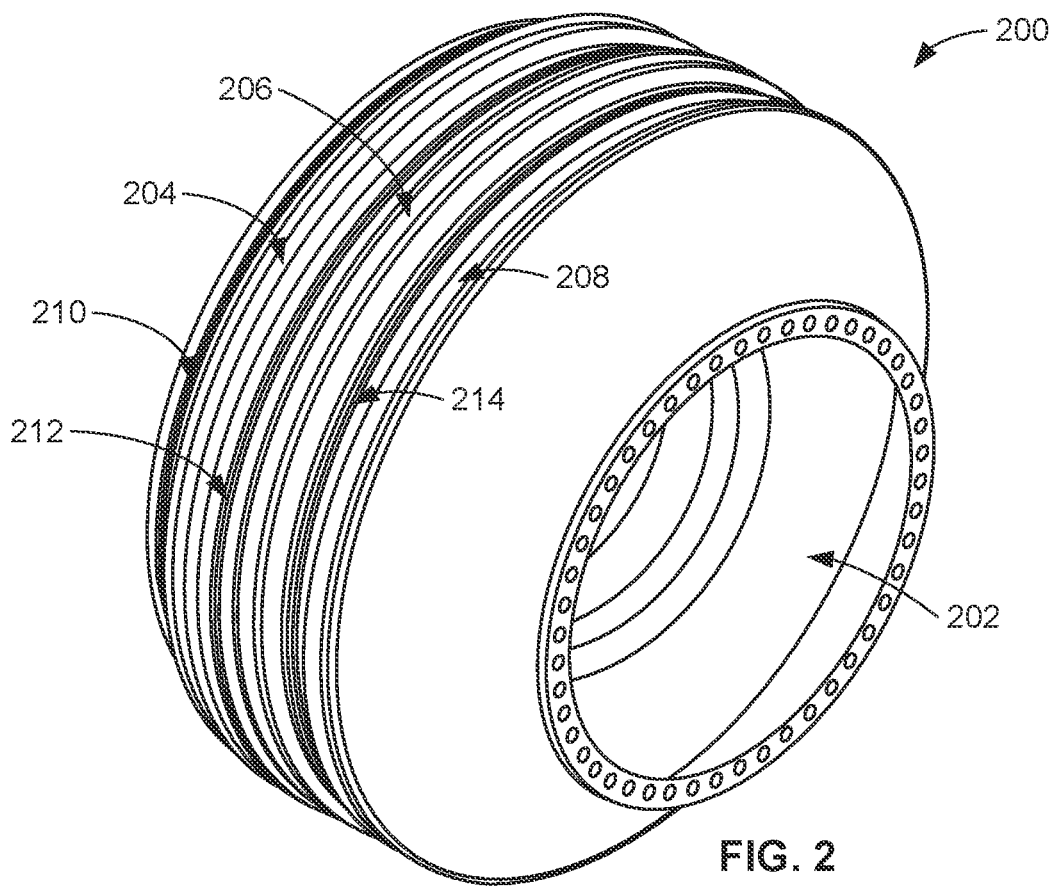
FIG. 2 is a back-right-top view of an example high-pressure compressor rotor of the example high-pressure compressor of the turbofan engine of FIG. 1 with its blades removed.

FIG. 2 is a back-right-top view of an example high-pressure compressor rotor 200 of the example high-pressure compressor 116 of the core gas turbine engine 106 of the turbofan engine 102 of FIG. 1 with its blades removed. The example high-pressure compressor rotor 200 includes an example central bore 202 which, in an installed state (not shown), is in a force-transmitting connection with the first (high-pressure) drive shaft 122 (FIG. 1) and the first (high-pressure) turbine 120 (FIG. 1). For example, the central bore 202 can be fixed to a rotor hub (not shown) including splines to fix the high-pressure compressor rotor 200 to the first drive shaft 122. In the example of FIG. 2, the high-pressure compressor rotor includes an example first annular dovetail slot 204 (e.g., a first slot 204), an example second annular dovetail slot 206 (e.g., a second slot 206), and an example third annular dovetail slot 208 (e.g., a third slot 208). In this example, the first dovetail slot 204 is the axially foremost dovetail slot, the third dovetail slot 208 is the axially aftmost dovetail slot, and the second dovetail slot 206 is positioned axially between the first dovetail slot 204 and the third dovetail slot 208.

In the example of FIG. 2, the high-pressure compressor rotor 200 includes an example first recess 210, an example second recess 212, and an example third recess 214. Each of the recesses 210, 212, 214 is axially aligned with a respective array of vanes (not shown) of the high-pressure compressor 116. Accordingly, the high-pressure compressor 116 is a three-stage compressor.

Figure 3:
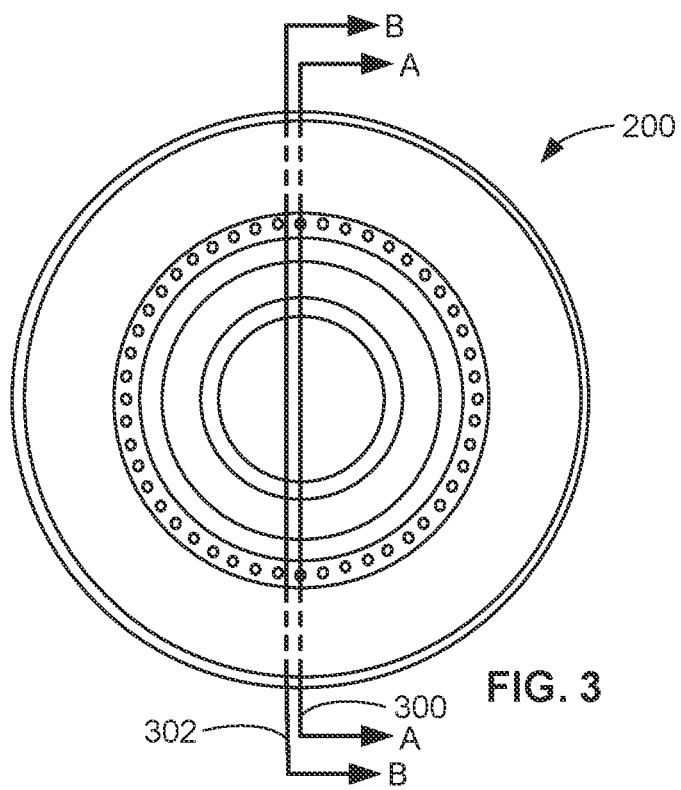
FIG. 3 is a back view of the example high-pressure compressor rotor of FIG. 2 including A-A and B-B section lines.

FIG. 3 is a back view (e.g., a view in the fore direction along the high-pressure compressor rotor 200 (FIG. 2)) of the high-pressure compressor rotor 200 including an A-A section line 300. In this example the A-A section line 300 divides the high-pressure compressor into a first half and second half across its diameter. In this example, a B-B section line 302 is also shown slightly displaced towards the left side (e.g., when viewed from the fore direction) of the high-pressure compressor rotor 200.

Figure 4:
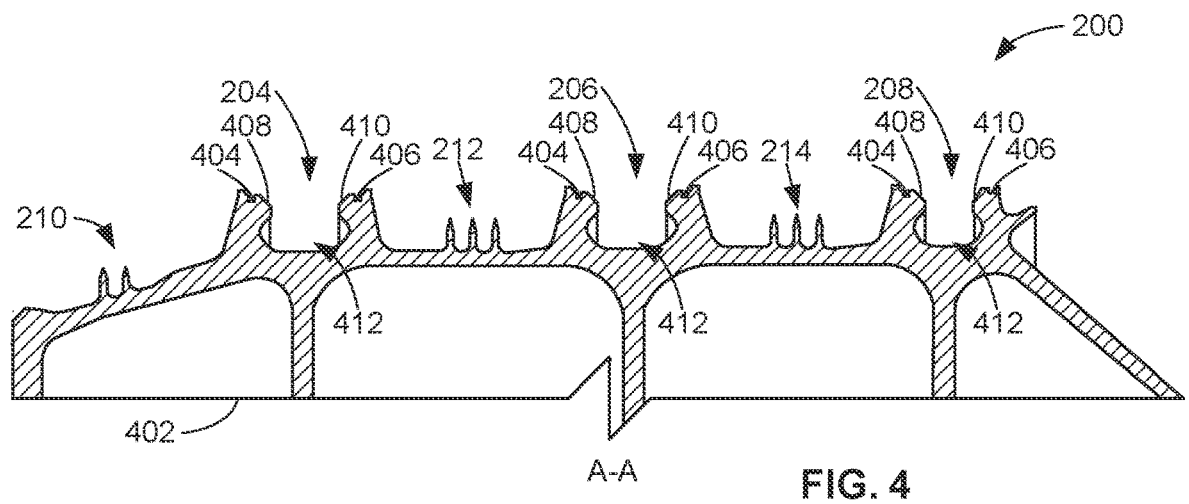
FIG. 4 is a partial cross section of the example high-pressure compressor rotor of FIG. 2 taken along the A-A section line of FIG. 3.

FIG. 4 is a partial cross section of the example high-pressure compressor rotor 200 of FIG. 2 taken along the A-A section line 300 of FIG. 3. In the example of FIG. 4, the cross sections of the first, second, and third dovetail slots 204, 206, 208 and the cross sections of the first, second, and third recesses 210, 212, 214 are shown. In the example of FIG. 4, the break line 402 cuts off the bottom portion of the cross section A-A for simplicity. It is understood, however, that the first, second, and third dovetail slots 204, 206, 208 and the first, second, and third recesses 210, 212, 214 are revolved annularly around the circumference of the high-pressure compressor rotor 200.

In the example of FIG. 4, the first dovetail slot 204 includes example first and second seal glands 404, 406 and example first and second axial flanges 408, 410 (e.g., first and second flanges). In this example, the first axial flange 408 extends axially in the aft direction over the third dovetail slot 208, and the second axial flange 410 extends axially in the fore direction over the third dovetail slot 208. Collectively, the first and second axial flanges 408, 410 define a lower cavity 412. In this example, the second and third dovetail slots 206, 208, respectively, include ones of the first and second seal glands 404, 406, first and second axial flanges 408, 410 and the lower cavity 412. In this example, the axial length spanned by the lower cavity 412 of the third dovetail slot 208 is smaller than the axial length spanned by the lower cavity of the first and second dovetail slots 204, 206. In this example, the axial length spanned between the axial flanges 408, 410 of the third dovetail slot 208 is less than the axial length spanned between the axial flanges 408, 410 of the first and second dovetail slots 204, 206. In other examples, there can be any other differential in size and shape between two or more dovetail slots on the compressor rotor 200.

Figure 5:
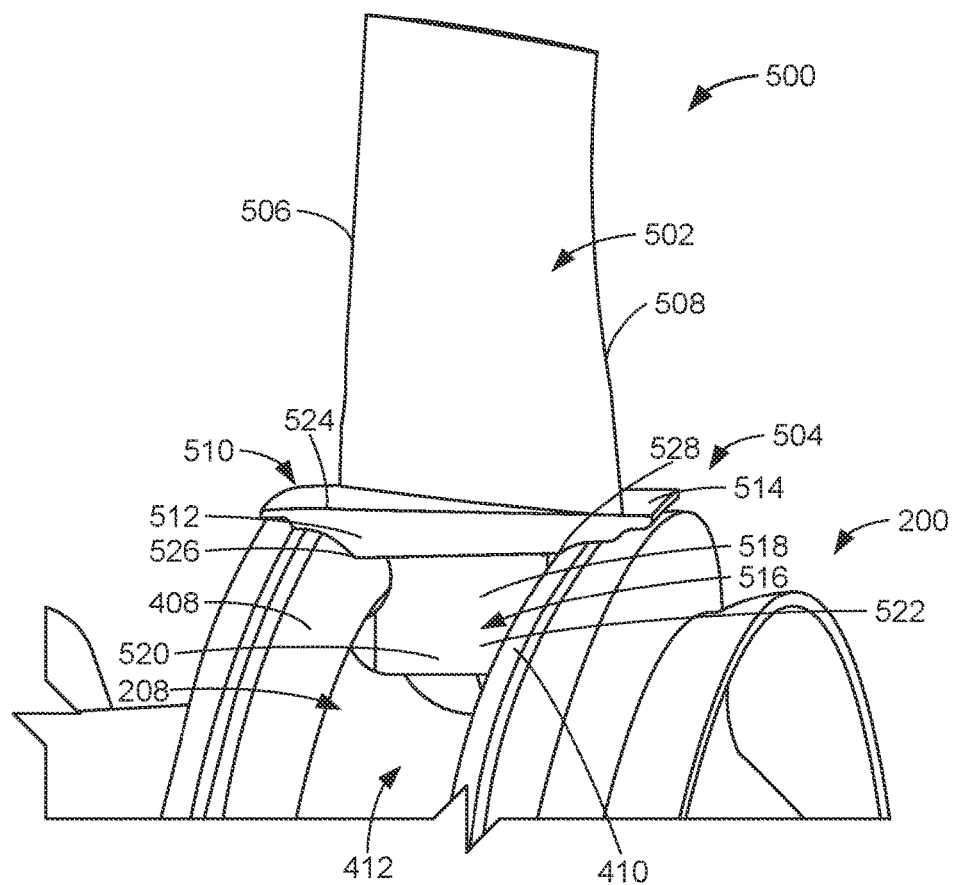
FIG. 5 is a perspective view of the example high-pressure compressor rotor of FIG. 2 with an example compressor blade mounted.

FIG. 5 is a perspective view of the example high-pressure compressor rotor 200 of FIG. 2 with an example compressor blade 500 (e.g., a blade 500, a compressor blade 500, etc.) mounted in the third dovetail slot 208 of FIG. 2. In the view of FIG. 5, the fore direction is to the left, and the aft direction is to the right. The example compressor blade 500 includes an example airfoil portion 502 and an example mounting portion 504. For illustrative purposes, only a single compressor blade 500 is shown in the third dovetail slot 208. However, it is understood that a plurality of compressor blades 500 are mounted in the dovetail slots 204, 206, 208

(FIG. 2) in an operative state. As used herein, an "operative state" refers to a state in which the high-pressure compressor 116 is fully mounted with compressor blades and/or compressor blocks for use in an airworthy engine such as the turbofan engine 102 (both of FIG. 1). For example, each of the dovetail slots 204, 206, 208 can include a key (e.g., a protrusion from the high-pressure compressor rotor 200 that fills a portion of the respective dovetail slot along its circumference) and/or a key slot (e.g., a recess within the respective dovetail slot into the rotor 200 to receive a corresponding key of the compressor blade 500) to prevent or otherwise restrict the plurality of compressor blades (e.g., ones of the compressor blades 500) from moving circumferentially in the respective dovetail slot in the operative state.

In this example, the airfoil portion 502 of the compressor blade 500 includes an example leading edge 506 circumferentially and axially displaced from an example trailing edge 508. The example airfoil portion 502 can include any suitable variation in angle of attack, thickness, length, camber, chord length, and/or geometry for desired operating parameters (e.g., air flow velocity, pressure, direction, and/or temperature) and corresponding vane geometry. The mounting portion 504 of the compressor blade 500 includes an example platform 510. In this example, the airfoil portion 502 of the compressor blade 500 extends radially outward from the platform 510. Further, the platform 510 includes an example first circumferential face 512 and an example first radial face 514.

Figure 6:
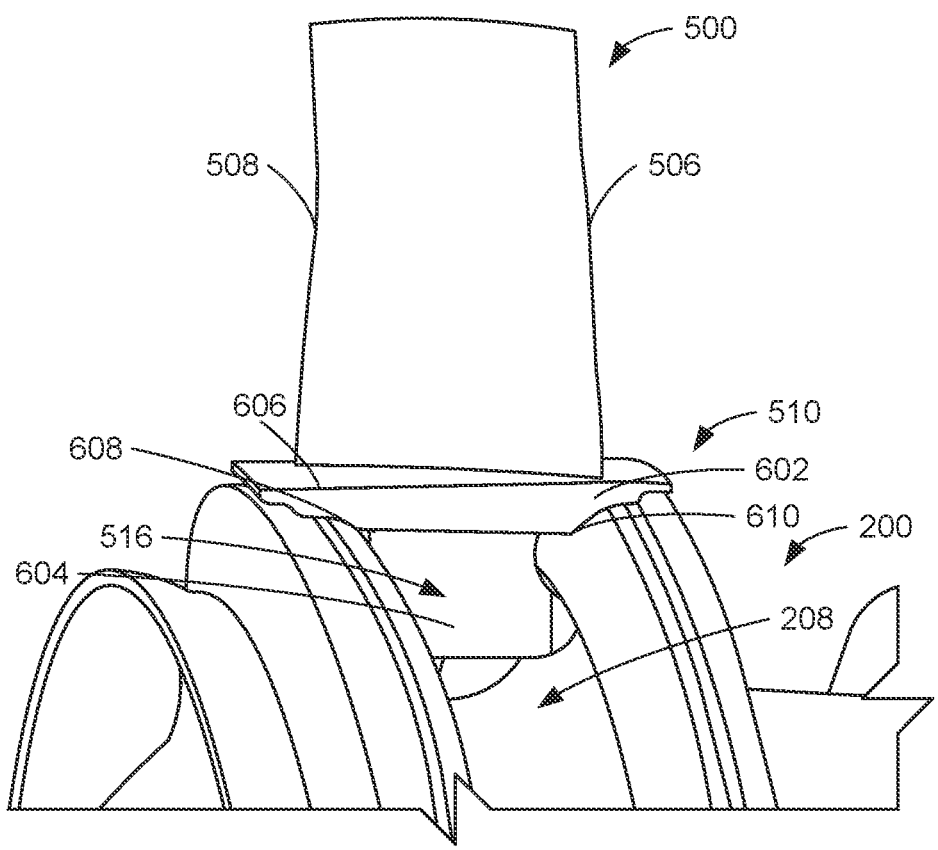
FIG. 6 is another perspective view of the example high-pressure compressor rotor of FIG. 2 with the example compressor blade mounted.

In the illustrated example of FIG. 5, the mounting portion 504 of the compressor blade 500 also includes an example dovetail protrusion 516. In this example, the dovetail protrusion 516 extends radially inward from the platform 510. The dovetail protrusion 516 of the compressor blade 500 also includes a radially outer portion 518 (e.g., a neck portion) that extends between the axial flanges 408, 410 of the dovetail slot 208. Further, a radially inner portion 520 of the dovetail protrusion 516 is disposed in the lower cavity 412 of the third dovetail slot 208. In this example, the axial length of the radially inner portion 520 is greater than the axial distance between the axial flanges 408, 410. Accordingly, the interference between the radially inner portion 520 and the axial flanges 408, 410 restricts the radial movement of the compressor blade 500 relative to the third dovetail slot 208. In the example of FIG. 6, the dovetail protrusion 516 also includes an example second circumferential face 522.

In the example of FIG. 5, the first circumferential face 512 of the compressor blade 500 is outlined by a first edge 524. In some examples, the first edge 524 outlines the radially outer portion of the first circumferential face 512 between a first point 526 and a second point 528 on the compressor blade 500.

FIG. 6 is another perspective view of the example high-pressure compressor rotor 200 of FIG. 2 with the example compressor blade 500 of FIG. 5 mounted. In the view of FIG. 6, the fore direction is to the right and the aft direction is to the left. In the example view of FIG. 6, the leading edge 506 is shown to the right of the trailing edge 508 of the compressor blade 500. Further, an example third circumferential face 602 of the platform 510 of the compressor blade 500 is visible. In one mounted state, a plurality of compressor blades 500 are installed in a dovetail slot (e.g., the third dovetail slot 208) such that the first circumferential face 512 (FIG. 5) of a first compressor blade 500 is in contact with the third circumferential face 602 of a second compressor blade 500. As such, in this mounted state, compressor blades 500 are installed annularly about the high-pressure compressor rotor 200 with a substantially uniform distribution. In the example of FIG. 6, the dovetail protrusion 516 also includes a fourth circumferential face 604.

In the example of FIG. 6, the third circumferential face 602 of the compressor blade 500 is outlined by a second edge 606. In some examples, the second edge 606 outlines the radially outer portion of the third circumferential face 602 between a third point 608 and a fourth point 610 on the compressor blade 500.

Figure 7:
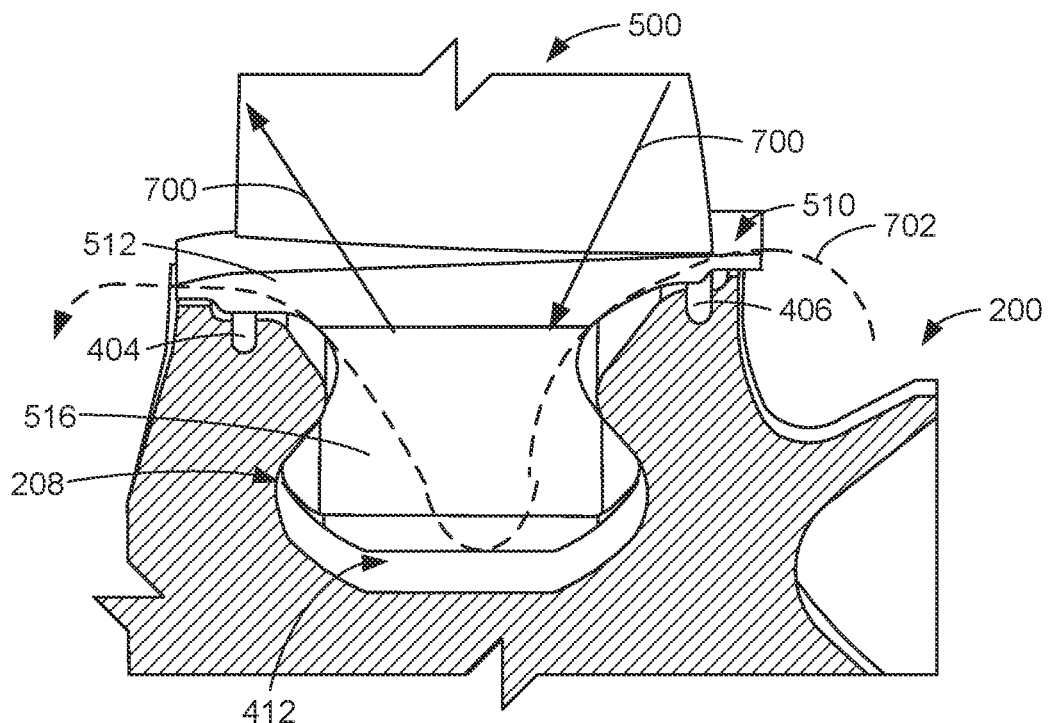
FIG. 7 is a partial cross section of the example high-pressure compressor rotor of FIG. 2 taken along the B-B section line of FIG. 3 depicting compressor dovetail slot leakage patterns.

FIG. 7 is a partial cross section of the example high-pressure compressor rotor 200 of FIG. 2 taken along the B-B section line 302 of FIG. 3 depicting compressor dovetail slot leakage patterns. In FIG. 7, one or more compressor blades 500 are mounted on the high-pressure compressor rotor 200. In the view of FIG. 7, the fore direction is to the left, and the aft direction is to the right. In FIG. 7, solid lines indicate example platform leakage streamlines 700 and a dashed line indicates an example axial leakage streamline 702. In FIG. 7, the streamlines 700, 702 indicate the leakage of air from the pressurized section of the high-pressure compressor (e.g., leakage from the second compressed air flow 156 of FIG. 1 into the lower cavity 412 of the third dovetail slot 208). Though the streamlines 700, 702 illustrate only a single path for the flow of air into and out of the third dovetail slot 208, it is understood that there are numerous variations in streamlines that constitute platform and/or axial leakage.

In FIG. 7, the platform leakage streamlines 700 occur primarily at the interfaces of two subsequent platforms 510 of respective compressor blades 500. For instance, the platform leakage streamlines 700 occur when pressurized air slips between the interface of the first circumferential face 512 and the third circumferential face 602 (FIG. 6) of respective blades. For instance, vibrational patterns of the respective compressor blades 500 can periodically separate the first circumferential face 512 of one blade from the third circumferential face 602 of another blade to allow leakage of air into the lower cavity 412 of a dovetail slot such as the third dovetail slot 208. Further, the dovetail protrusions 516 span less circumferential distance in the dovetail slot 208 than do the platforms 510 of respective compressor blades 500. Thus, the dovetail protrusions 516 occupy a relatively low amount of volume and circumferential length of the lower cavity 412 and do not act to restrict the platform leakage indicated by the platform leakage streamlines 700.

In FIG. 7, axial leakage is indicated by the axial leakage streamline 702. In this instance, the axial leakage streamline 702 extents from aft to fore relative to the high-pressure compressor rotor 200 to signify the movement of air from a location of relatively higher pressure (e.g., the aft of the compressor blade 500) to a location of relatively lower pressure (e.g., the fore of the compressor blade 500). In other instances, the air can leak from the fore to the aft of the compressor blade(s) 500 due to the velocity of the air flow. In each of these instances, the compression ratio of the high-pressure compressor is reduced by the axial leakage patterns. In some high-pressure compressors, an annular sealant wire can be placed in the seal glands 404, 406 of the third dovetail slot 208. However, this leads to the wear of both the high-pressure compressor rotor 200 and the compressor blade(s) 500. Additionally, the large amount of open volume within the lower cavity 412 does little to prevent the axial leakage that has surpassed the sealant wire.

In contrast to the use of sealant wire and/or an arrangement in which the first circumferential face 512 of one blade is in a direct interface with the third circumferential face 602 of another blade, examples disclosed herein substantially prevent and/or reduce platform and axial leakage indicated by the streamlines 700, 702. Though platform leakage and axial leakage streamlines 700, 702 are discussed herein, it is understood that examples disclosed herein substantially prevent and/or reduce a wide variety of leakage patterns and/or streamlines not limited to platform leakage and axial leakage.

Figure 8:
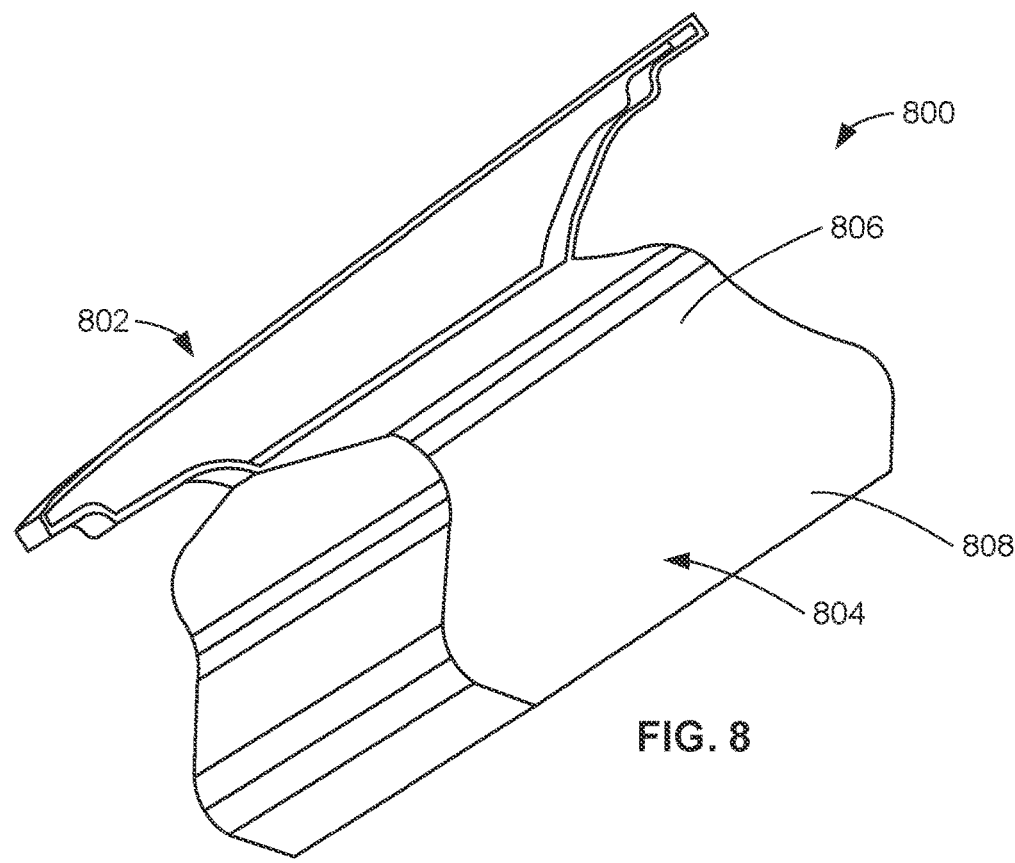
FIG. 8 is a front-right-top view of an example compressor block that can be used in connection with the high-pressure compressor rotor of FIG. 2.

FIG. 8 is a front-right-top view of an example compressor block 800 (e.g., a block 800, a dovetail block 800, etc.) that can be used in connection with the high-pressure compressor rotor 200 of FIG. 2. For example, the dimensions of the compressor block 800 can be tailored to the dimensions of each of the first, second, and third dovetail slots 204, 206, 208 (FIG. 2). In this example, the compressor block 800 includes an example platform interface portion 802 and an example dovetail interface portion 804. The compressor block 800 acts to prevent leakage into a dovetail slot such as the first, second, and third dovetail slots 204, 206, 208, preventing both platform leakage and axial leakage. In some examples, the compressor block 800 can be a compressor block. The example compressor block 800 also eliminates the need for annular wire seals to prevent leakage, and, thus, reduces wear on the compressor blade(s) 500 (FIG. 5) and the high-pressure compressor rotor 200.

In the example of FIG. 8, in an example mounted state, the compressor block 800 is placed in one of the first, second, and third dovetail slots 204, 206, 208 between two compressor blades 500 to prevent platform leakage and axial leakage. For example, in an operative state, each compressor block 800 of a plurality is in contact with two compressor blades 500 and each compressor blade 500 of a plurality is in contact with two compressor blocks 800 in the dovetail slot 204, 206, 208. In this example, the compressor block 800 includes an example radially outer portion 806 and an example radially inner portion 808.

Figure 9:
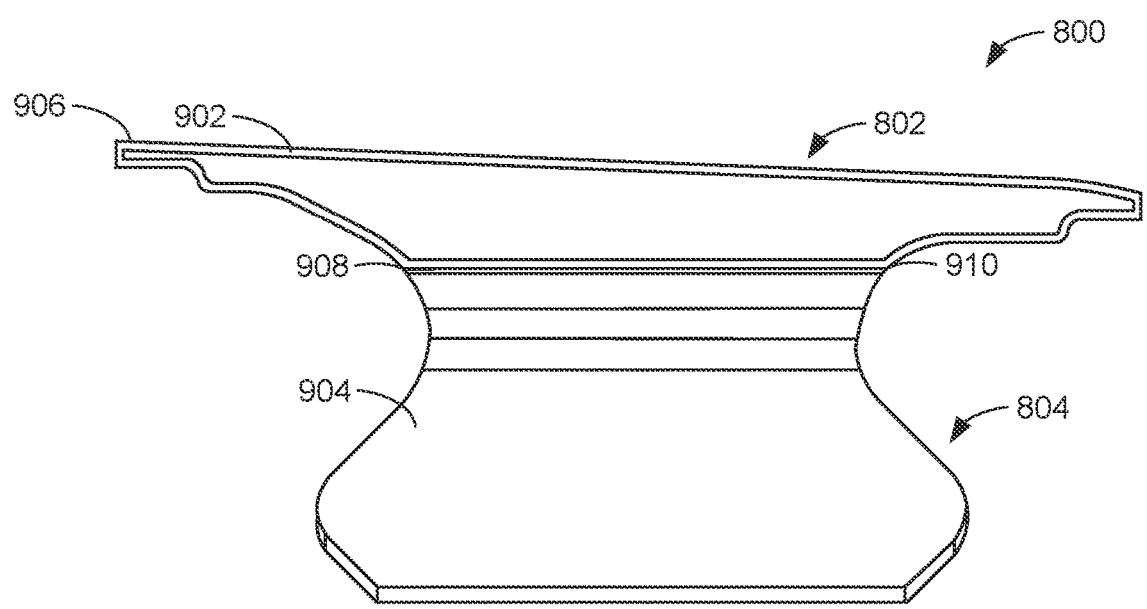
FIG. 9 is a left side view of the example compressor block of FIG. 8.

FIG. 9 is a left side view of the example compressor block 800 of FIG. 8. In the view of FIG. 9, the fore direction is to the right, and the aft direction is to the left. In this example, the platform interface portion 802 of the compressor block 800 includes an example first circumferential face 902, and the dovetail interface portion 804 of the compressor block 800 includes an example second circumferential face 904. In one or more examples, in an operative state, the first circumferential face 902 of the compressor block 800 is in direct contact with the first circumferential face 512 (FIG. 5) of the platform 510 (FIG. 5) of a first one of the compressor blades 500 (FIG. 5). In this example, in an operative state, the second circumferential face 904 of the compressor block 800 is in direct contact with the second circumferential face 522 (FIG. 5) of the dovetail protrusion 516 (FIG. 5) of the first one of the compressor blades 500.

In the example of FIG. 9, the first circumferential face 902 of the compressor block 800 is outlined by a first edge 906. In some examples, the first edge 906 outlines the radially outer portion of the first circumferential face 902 between a first point 908 and a second point 910 on the compressor block 800.

Figure 10:
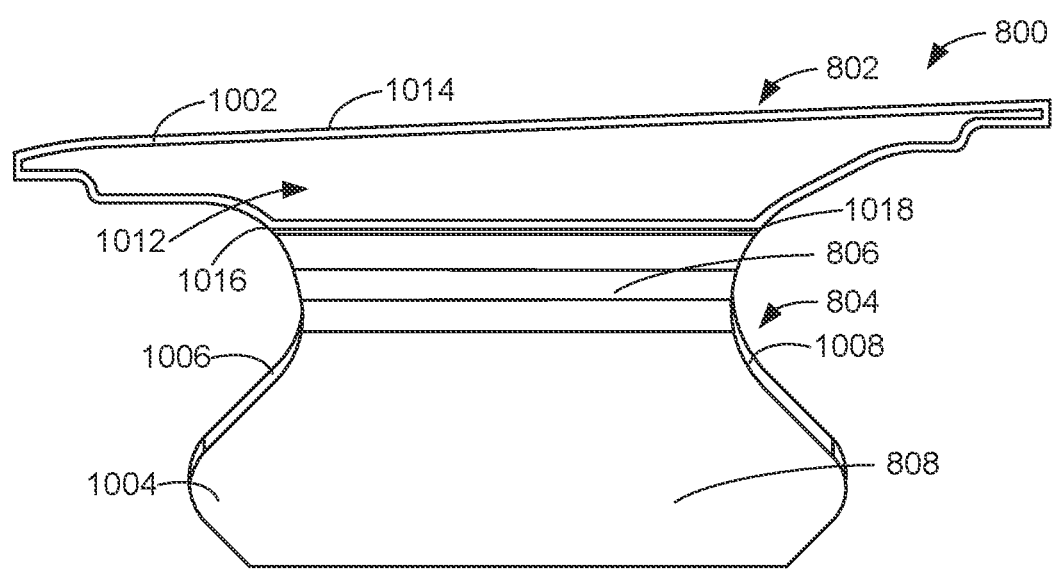
FIG. 10 is a right side view of the example compressor block of FIG. 8

FIG. 10 is a right side view of the example compressor block 800 of FIG. 8. In the view of FIG. 10, the fore direction is to the left, and the aft direction is to the right. In this example, the platform interface portion 802 of the compressor block 800 includes an example third circumferential face 1002, and the dovetail interface portion 804 of the compressor block 800 includes an example fourth circumferential face 1004. In one example, in an operative state, the third circumferential face 1002 of the compressor block 800 is in direct contact with the third circumferential face 602 (FIG. 6) of the platform 510 (FIG. 5) of a second one of the compressor blades 500 (FIG. 5). In this example, in an operative state, the fourth circumferential face 1004 of the compressor block 800 is in direct contact with the fourth circumferential face 604 (FIG. 6) of the dovetail protrusion 516 (FIG. 5) of the second one of the compressor blades 500. In an operative state, individual compressor blocks 800 are placed in a sequentially alternating order with individual compressor blades 500 in the dovetail slots 204, 205, 208 (FIG. 2) of the high-pressure compressor rotor 200 (FIG. 2) according to the above arrangement.

In the example of FIG. 10, the dovetail interface portion 804 also includes a fore face 1006 and an aft face 1008. In a mounted state and/or an operative state, a portion of the fore face 1006 is to directly contact a portion of the first axial flange 408 (FIG. 4) of the dovetail slot (e.g., one of the dovetail slots 204, 206, 208) where the compressor block 800 is installed. Similarly, a portion of the aft face 1008 is to directly contact a portion of the second axial flange 410 (FIG. 4) of the dovetail slot where the compressor block 800 is installed. In this example, the fore face 1006 and the aft face 1008 define the radially outer portion 806 (e.g., a neck, a second neck, etc., FIG. 8) therebetween. In a similar fashion to the mounting of the compressor blade 500 (FIG. 5), the radially inner portion 808 of the dovetail interface portion 804 of the compressor block 800 has a greater axial length than radially outer portion 806 and/or the distance between the axial flanges 408, 410, thereby restricting radial movement of the compressor block 800 relative to the dovetail slot (e.g., one of the first, second, and third dovetail slots 204, 206, 208) in which the compressor block 800 is installed.

In the example of FIG. 10, the compressor block 800 also includes a central opening 1012 (e.g., an opening 1012). In this example, the central opening 1012 reduces material needed for manufacture of the compressor block 800 while maintaining the exposed surface area of the platform interface portion 802 of the compressor block 800 in an operative state. In the example of FIG. 10, the third circumferential face 1002 of the compressor block 800 is outlined by a second edge 1014. In some examples, the second edge 1014 outlines the radially outer portion of the third circumferential face 1002 between a third point 1016 and a fourth point 1018 on the compressor block 800.

Figure 11:
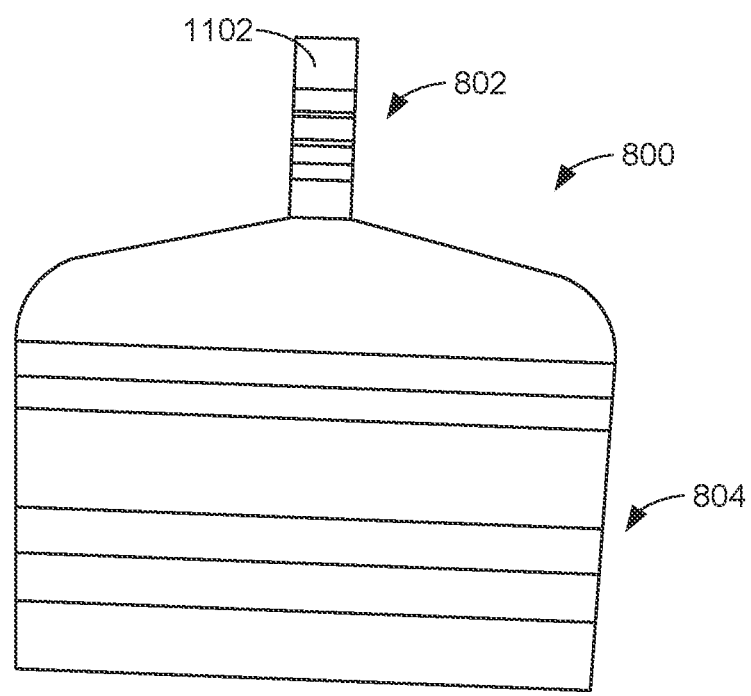
FIG. 11 is a front view of the example compressor block of FIG. 8.

FIG. 11 is a front side view (e.g., view in the aft direction along the high-pressure compressor rotor 200 (FIG. 2) centerline) of the example compressor block 800 of FIG. 8. FIG. 11 depicts the geometric asymmetry of the compressor block 800. In this example, the compressor block 800 includes a first radial face 1102. The visibility of the first radial face 1102 of the compressor block 800 illustrates the radial displacement, asymmetry, and/or convex curvature from fore to aft (e.g., from orthographic front to back) in the platform interface portion 802 of the compressor block 800. Further, the dovetail interface portion 804 is of greater radial length on its right side (e.g., its relatively circumferentially clockwise side) than on its left side (e.g., its relatively circumferentially counterclockwise side).

Figure 12:
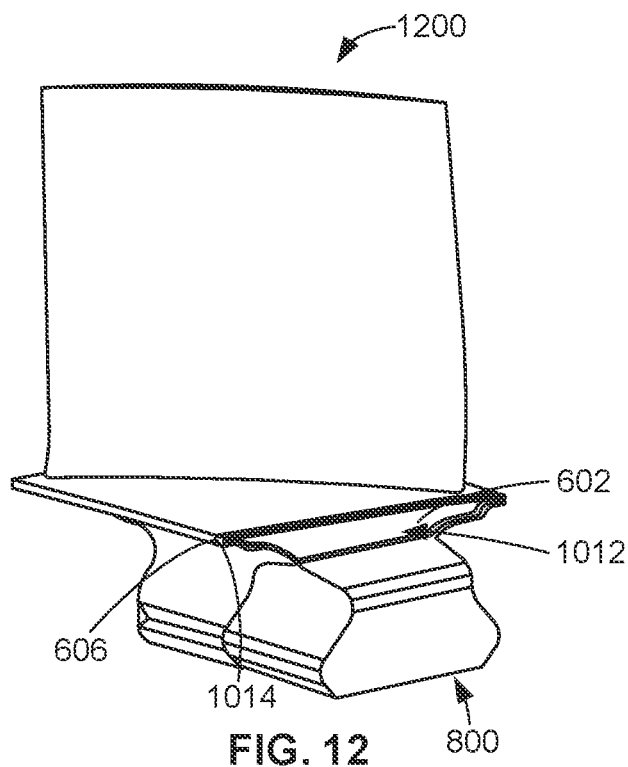
FIG. 12 is a perspective view of the example compressor block of FIG. 8 placed in series with a first example compressor blade such as the example compressor blade of FIG. 5.

FIG. 12 is a perspective view of the example compressor block 800 of FIG. 8 placed in series with a first example compressor blade 1200 such as the example compressor blade 500 of FIG. 5. In the view of FIG. 12, the fore direction is to the right and into the page, and the aft direction is to the left and out of the page. In this example, the geometry of the first compressor blade 1200 and the compressor block 800 are such that the two can be mounted on the second dovetail slot 206 (FIG. 2) of the high-pressure compressor rotor 200 (FIG. 2). Though the dimensions and/or geometry of the first compressor blade 1200 can be different from the dimensions and/or geometry of the compressor blade 500, it is understood that the first compressor blade 1200 includes all the features of the compressor blade 500 indicated with numerals. Additionally, the placement of the first compressor blade 1200 and the compressor block 800 is a placement that occurs when the two are mounted sequentially in the second dovetail slot 206.

In the example of FIG. 12 the third circumferential face 602 of the first compressor blade 1200 (shown partially through the opening 1012) directly interfaces the third circumferential face 1002 (FIG. 10, obscured from view) of the compressor block 800. Further in this example, the fourth circumferential face 604 (FIG. 6, obscured from view) of the first compressor blade 1200 directly interfaces the fourth circumferential face 1004 (FIG. 10, obscured from view) of the compressor block 800. In the example of FIG. 12, the second edge 1014 of the compressor block 800 is substantially flush and/or aligned with the second edge 606 of the first compressor blade 1200. As used herein, "substantially flush and/or aligned" refers to a state where two edges are displaced no more than 0.01 inches from one another. In other examples, the second edges 606, 1014 of the respective first compressor blade 1200 and the compressor block 800 can have any suitable geometry relative to one another.

Figure 13:
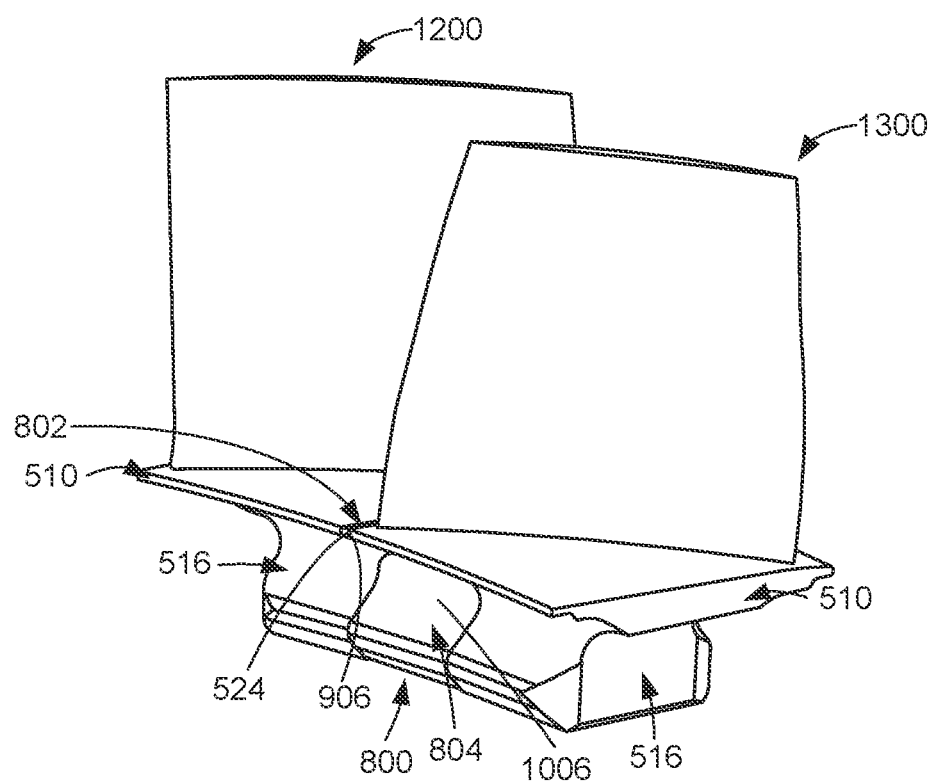
FIG. 13 is a perspective view of the example compressor block of FIG. 8 placed in series with first and second example compressor blades such as the compressor blade of FIG. 5.

FIG. 13 is a perspective view of the example compressor block 800 of FIG. 8 placed in series with the first compressor blade 1200 and a second example compressor blade 1300 such as the compressor blade 500 of FIG. 5. In this example, the geometries of the first compressor blade 1200, second compressor blade 1300, and the compressor block 800 are such that the three can be mounted on the second dovetail slot 206 (FIG. 2) of the high-pressure compressor rotor 200 (FIG. 2). Though the dimensions and/or geometry of the second compressor blade 1300 can be different from the dimensions and/or geometry of the compressor blade 500, it is understood that the second compressor blade 1300 includes all the features of the compressor blade 500 indicated with numerals. In the example of FIG. 13, the first compressor blade 1200 and the compressor block 800 are in the positions and locations shown in FIG. 12. Accordingly, the descriptions of the interfaces of the first compressor blade 1200 and the compressor block 800 are not repeated. In the example of FIG. 13, the second compressor blade 1300 is positioned sequentially to the to the compressor block 800. Thus, in the example of FIG. 13, the first compressor blade 1200, the compressor block 800, and the second compressor blade 1300 are placed in series in the second dovetail slot 206 (FIG. 2).

In the example of FIG. 13, the first circumferential face 512 (FIG. 5, obscured from view) of the second compressor blade 1300 directly interfaces the first circumferential face 902 (FIG. 9, obscured from view) of the second compressor blade 1300. Further, in this example, the second circumferential face 522 (FIG. 5, obscured from view) of the second compressor blade 1300 directly interfaces the second circumferential face 904 (FIG. 9, obscured from view) of the second compressor blade 1300. In this example, the first edge 906 of the compressor block 800 is substantially flush and/or aligned with the first edge 524 of the second compressor blade 1300. In other examples, the first edges 524, 906 of the respective second compressor blade 1300 and the compressor block 800 can have any suitable geometry relative to one another.

Accordingly, in the example of FIG. 13, the dovetail interface portion 804 of the compressor block 800 is disposed between respective dovetail protrusions 516 of the first and second compressor blades 1200, 1300. Additionally, the platform interface portion 802 of the compressor block 800 is disposed between respective platforms 510 of the first and second compressor blades 1200, 1300. As such, the axial and platform leakage patterns (e.g., the leakage streamlines 700, 702 of FIG. 2) are substantially prevented and/or reduced by the placement of a compressor block 800 between respective first and second compressor blades 1200, 1300.

In some high-pressure compressors, the first circumferential face 512 of the second compressor blade 1300 interfaces directly with the third circumferential face 602 of the first compressor blade 1200. These configurations allow a large circumferential gap and relatively large volumetric space between the second circumferential face 522 of the second compressor blade 1300 and the fourth circumferential face 604 of the first compressor blade 1200. In these high-pressure compressors, air that enters at the interface of the platforms 510 of the first and second compressor blades 1200, 1300 (e.g., platform leakage) flows directly into the lower cavity 412 of the respective dovetail slot (e.g., the first, second, or third dovetail slot 204, 206, 208 of FIG. 2). In examples disclosed herein, however, platform leakage patterns (e.g., the platform leakage streamlines 700) and/or axial leakage patterns (e.g., axial leakage streamline 702) are substantially prevented and/or reduced by the placement of a compressor block 800 between successive compressor blades (e.g., the first and second compressor blades 1200, 1300). This is because the air flow (e.g., the platform leakage streamlines 702 and/or the axial leakage streamline 702) must circumvent the dovetail interface portion(s) 804 in addition to the platform interface portion(s) 802. In some examples, a portion of the fore and aft faces 1006, 1008 (FIG. 10) are in direct contact with the axial flanges 408, 410 (FIG. 4) of a dovetail slot 206 along with the dovetail interface portion(s) 804 with the second and fourth circumferential faces 522, 604 of respective (e.g., sequential) second and first compressor blades 1300, 1200, thereby preventing air flow from bypassing the compressor block 800 and moving into the lower cavity 412.

In the case of the axial leakage patterns (e.g., the axial leakage streamline 702), in some high-pressure compressors, sealant wire is placed under the fore and aft ends of the platforms 510 of the first and second compressor blades 1200, 1300, which is both ineffective and causes wear to the first and second compressor blades 1200, 1300 and the high-pressure compressor rotor 200. In examples disclosed herein, however, the large circumferential gap and relatively large volumetric space between the fourth circumferential face 604 of the first compressor blade 1200 and the second circumferential face 522 of the second compressor blade 1300 is filled with the dovetail interface portion 804 of the compressor block 800. Additionally, during operation of the turbofan engine 102, the high-pressure compressor rotor 200 spins at high speeds, urging the compressor block(s) radially outward by centripetal acceleration and thereby urging the fore and aft faces 1006, 1008 against the axial flanges 408, 410 of the dovetail slot (e.g., the first, second, and/or third dovetail slots 204, 206, 208). This movement further restricts the axial leakage of air into the lower cavity 412 of the dovetail slot.

Figure 14:
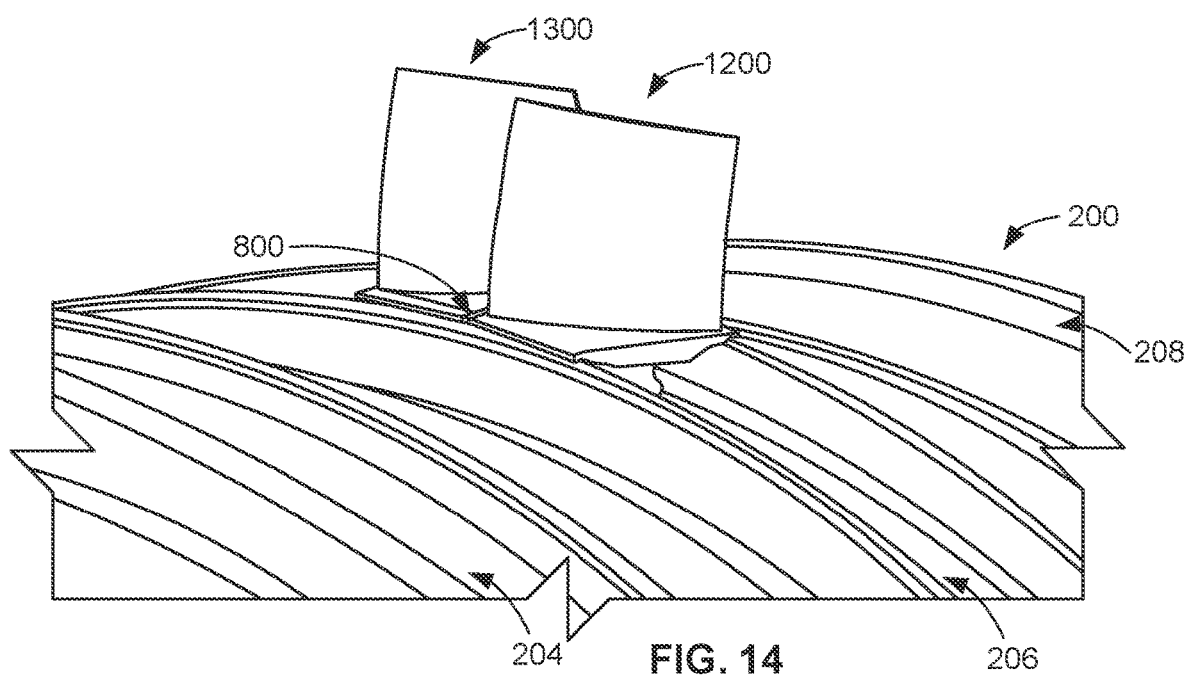
FIG. 14 is a perspective view of the example compressor block of FIG. 8 and the first and second example compressor blades of FIGS. 12 and 13 mounted on the example high-pressure compressor rotor of FIG. 2.

FIG. 14 is an enlarged perspective view of the example compressor block 800 of FIG. 8 and the first and second compressor blades 1200, 1300 of FIGS. 12 and 13 mounted on the high-pressure compressor rotor 200 of FIG. 2 in the second dovetail slot 206. In the view of FIG. 14, the fore direction is to the left and out of the page and the aft direction is to the right and into the page. In this example, in an operative state, each of the first, second, and third dovetail slots 204, 206, 208 is mounted in an alternating fashion between compressor blocks (e.g., ones of the compressor blocks 800) and compressor blades (e.g., ones of the compressor blades 500). In some examples, the dimensions and/or geometry of the compressor blocks are the same in a particular dovetail slot (e.g., one of the dovetail slots 204, 206, 208), and the dimensions and/or geometry of the compressor blades are the same in the particular dovetail slot. In other examples, there is variation between the geometry and/or dimensions of the compressor blocks and/or blades within a particular dovetail slot.

Figure 15:
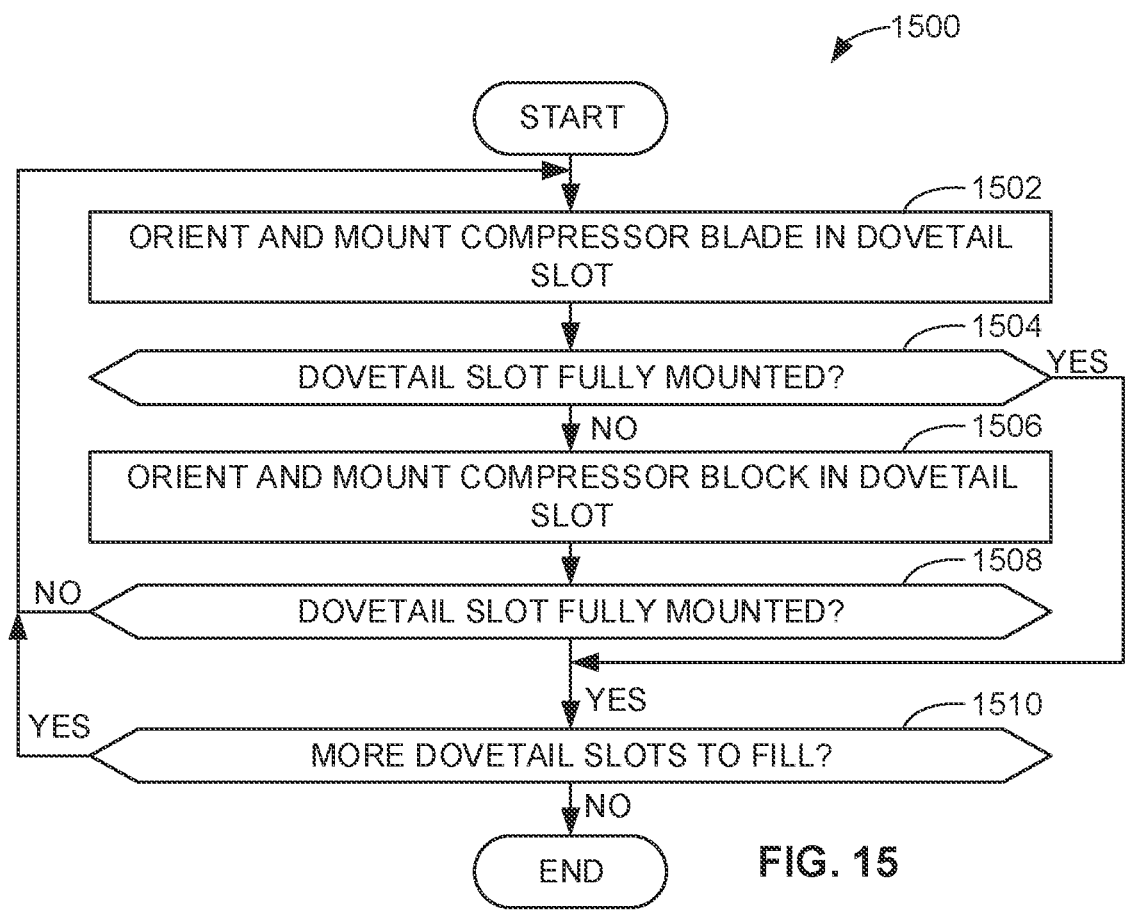
FIG. 15 is a flowchart of an example process of mounting example compressor blocks and compressor blades on the example high-pressure compressor of FIG. 2.

FIG. 15 is a flowchart of an example process 1500 of mounting example compressor blocks (e.g., ones of the compressor blocks 800) and compressor blades (e.g., ones of the compressor blades 500) on the example high-pressure compressor rotor 200 of FIG. 2. The example process 1500 begins when a compressor blade is oriented in a desired direction (e.g., according to the fore and aft directions of the compressor rotor) and mounted and secured to a dovetail slot (e.g., one of the first, second, and/or third dovetail slots 204, 206, 208 of FIG. 2) of the compressor rotor 200 and/or is placed in a mounted position relative to an already mounted compressor block (Block 1502).

The process 1500 proceeds by determining whether the dovetail slot is fully mounted (e.g., sufficiently filled with compressor blades and/or compressor blocks annularly about its circumference for an operative state) (Block 1504). When it is determined that the dovetail slot is fully mounted (e.g., block 1504 returns YES), the process 1500 proceeds to block 1510. When it is determined that the dovetail slot is not fully mounted (e.g., block 1504 returns NO), the process 1500 proceeds to block 1506.

At block 1506, a compressor block (e.g., a compressor block 800) is oriented in the correct direction and mounted and secured to the dovetail slot of the high-pressure compressor rotor 200 and/or is placed in a mounted position relative to an already mounted compressor block. In the example process 1500, the positions of blocks 1502 and 1506 can be exchanged.

The process 1500 proceeds by determining whether the dovetail slot is fully mounted (e.g., sufficiently filled with compressor blades and/or compressor blocks annularly about its circumference for an operative state). (Block 1508). When it is determined that the dovetail slot is fully mounted (e.g., block 1508 returns YES), the process 1500 proceeds to block 1510. When it is determined that the dovetail slot is not fully mounted (e.g., block 1504 returns NO), the process 1500 process 1500 returns back to block 1502.

At block 1510, it is determined whether there are more dovetail slots to fill (e.g., more of dovetail slots 204, 206, 208 of FIG. 2). When there are more dovetail slots to fill (e.g., block 1510 returns YES), the process 1500 returns to block 1502. When there are no more dovetail slots to fill (e.g., block 1510 returns NO), the process 1500 ends.

Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that improve the functioning of gas turbines by increasing the efficiency and/or compression ratios of compressors of gas turbines. Particularly, disclosed herein are example compressor blocks that prevent the leakage of airflow into dovetail slots of example rotors of compressors for gas turbines.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the invention are provided by the subject matter of the following clauses:

1. A compressor apparatus comprising a rotor defining a circumferential direction, wherein the rotor includes a slot, the slot including a first neck portion, a first blade and a second blade disposed circumferentially apart in the slot, and a block disposed in the slot circumferentially between the first blade and the second blade, the block including second neck portion, the first neck portion to at least partially interface the second neck portion.
2. The apparatus of any preceding clause wherein the compressor is a high-pressure, multi-stage compressor.

3. The apparatus of any preceding clause wherein the first and second blades include dovetail protrusions defining a volumetric space circumferentially therebetween, and wherein the block includes a dovetail portion.

4. The apparatus of any preceding clause wherein the dovetail portion occupies at least a portion of the volumetric space in the slot between the dovetail protrusions to reduce air flow leakage into the slot.

5. The apparatus of any preceding clause wherein the first and second blades include platforms and the block includes a platform portion, the platform portion to interface the platforms of the first and second blades to reduce air flow leakage into the slot.

6. A gas turbine apparatus comprising a compressor rotor, the compressor rotor including a slot, a first blade and a second blade disposed in the slot, the first and second blades including a platform and a dovetail, a block disposed in the slot between the first and second blades, the block to interface the platform and dovetail of the first blade and the platform and dovetail of the second blade.

7. The apparatus of any preceding clause wherein the slot defines first and second flanges, the first and second flanges to retain the first blade, second blade, and block from radial movement.

8. The apparatus of any preceding clause wherein the gas turbine is of a propulsion system of an aircraft.

9. The apparatus of any preceding clause wherein the slot includes first and second grooves and the block includes first and second protrusions, the first groove to receive the first protrusion and the second groove to receive the second protrusion.

10. The apparatus of any preceding clause wherein the block includes a platform portion to interface with the platforms of the first and second blades, the platform portion including an opening.

11. The apparatus of any preceding clause wherein the gas turbine defines axial and radial directions, an axially aft portion of the platform portion disposed radially outward from an axially fore portion of the platform portion.

12. The apparatus of any preceding clause wherein at least a portion of the block is hollow.

13. An apparatus including a rotor defining a radial direction and a circumferential direction, the rotor including a slot with a neck, a first blade and a second blade disposed in the slot, the first and second blades each having a protrusion and a platform, and a block disposed circumferentially between the first blade and the second blade in the slot, the block radially retained by at least one of a) the neck or b) the platforms of the first and second blades.

14. The apparatus of any preceding clause wherein the first and second blades and the block each include a first face disposed radially outward from a second face and include a third face disposed radially outward from a fourth face, the first face of the block to interface the first face of the first blade, the second face of the block to interface the second face of the first blade, the third face of the block to interface the third face of the second blade, and the fourth face of the block to interface the fourth face of the second blade.

15. The apparatus of any preceding clause wherein edges of the block are substantially aligned with edges of the first and second blades.

16. The apparatus of any preceding clause wherein the block is a first block, and further including a second block radially retained by at least one of the neck and the platforms of the first and second blades.

17. The apparatus of any preceding clause wherein the platforms of the first and second blades extend a greater length in the circumferential direction then do the protrusions of the first and second blades, and wherein the block is to at least partially directly interface the first and second blades at the platforms and the protrusions.

18. The apparatus of any preceding clause wherein the block includes an opening.

19. The apparatus of any preceding clause wherein the block is manufactured using an additive manufacturing process.

20. The apparatus of any preceding clause wherein the platforms of the first and second blades radially retain the block.

What is claimed is:

1. A compressor comprising:
a rotor defining a radial direction and a circumferential direction, the rotor including a slot;
a first blade and a second blade disposed in the slot, the first blade including a first platform and a first dovetail, the second blade including a second platform and a second dovetail; and
a hollow block disposed circumferentially between the first blade and the second blade in the slot, the hollow block to move radially outward to contact axial flanges of the slot during operation of the compressor, the hollow block including:
a platform interface portion to interface with the first platform and the second platform, the platform interface portion including a central opening defined by a circumferential face of the platform interface portion; and
a hollow dovetail interface portion to couple the first dovetail and the second dovetail.

2. The compressor of claim 1, wherein the compressor is a high-pressure, multi-stage compressor.

3. The compressor of claim 1, wherein the first and second blades are two blades of a plurality of blades disposed in the slot, the hollow block is a first hollow block of a plurality of hollow blocks disposed in the slot, and wherein a first quantity of the plurality of blades is one greater than a second quantity of the plurality of hollow blocks in the slot.

4. The compressor of claim 1, wherein the platform interface portion is hollow.

5. The compressor of claim 1, wherein the slot includes a neck defining first and second axial flanges, and wherein the hollow block includes a fore face and an aft face, the fore face in contact with a first axial face of the first axial flange and the aft face coupled with a second axial face of the second axial flange.

6. The compressor of claim 1, wherein the platform interface portion includes a radial face that increases in radial length over an interval of the radial face in an axial direction.

7. A gas turbine comprising:
a compressor including a rotor defining a radial direction and a circumferential direction, the rotor including a slot;
a first blade and a second blade disposed in the slot, the first blade including a first platform and a first dovetail, the second blade including a second platform and a second dovetail; and
a hollow block disposed circumferentially between the first blade and the second blade in the slot, the hollow block to move radially outward to contact axial flanges of the slot during operation of the compressor, the hollow block including:
  a platform interface portion to interface with the first platform and the second platform, the platform interface portion including a central opening defined by a circumferential face of the platform interface portion; and
  a hollow dovetail interface portion to couple the first dovetail and the second dovetail.

8. The gas turbine of claim 7, wherein the gas turbine is of a propulsion system of an aircraft.

9. The gas turbine of claim 7, wherein the first and second blades are two blades of a plurality of blades disposed in the slot, the hollow block is a first hollow block of a plurality of hollow blocks disposed in the slot, and wherein a first quantity of the plurality of blades is one greater than a second quantity of the plurality of hollow blocks in the slot.

10. The gas turbine of claim 7, wherein the platform interface portion is hollow.

11. The gas turbine of claim 7, wherein the platform interface portion includes a radial face that increases in radial length over an interval of the radial face in an axial direction.

12. The gas turbine of claim 7, wherein the compressor is a high-pressure, multi-stage compressor.

13. An apparatus comprising:
  a compressor including a rotor defining a radial direction and a circumferential direction, the rotor including a slot;
  a first blade and a second blade disposed in the slot, the first blade including a first platform and a first dovetail, the second blade including a second platform and a second dovetail; and
  a hollow block disposed circumferentially between the first blade and the second blade in the slot, the hollow block to move radially outward to contact axial flanges of the slot during operation of the compressor, the hollow block including:
    a platform interface portion to interface with the first platform and the second platform, the platform interface portion including a central opening defined by a circumferential face of the platform interface portion; and
    a hollow dovetail interface portion to couple the first dovetail and the second dovetail.

14. The apparatus of claim 13, wherein the first and second blades are two blades of a plurality of blades disposed in the slot, the hollow block is a first hollow block of a plurality of hollow blocks disposed in the slot, and wherein a first quantity of the plurality of blades is one greater than a second quantity of the plurality of hollow blocks in the slot.

15. The apparatus of claim 13, wherein the platform interface portion is hollow.

16. The apparatus of claim 13, wherein the slot includes a neck defining first and second axial flanges, and wherein the hollow block includes a fore face and an aft face, the fore face in contact with a first axial face of the first axial flange and the aft face coupled with a second axial face of the second axial flange.

17. The apparatus of claim 13, wherein the platform interface portion includes a radial face that increases in radial length over an interval of the radial face in an axial direction.

* * * * *